(12) United States Patent
Kim et al.

(10) Patent No.: US 10,879,789 B2
(45) Date of Patent: Dec. 29, 2020

(54) SYSTEM AND METHOD FOR CONTROLLING VOLTAGE CONTROL LOOP IN POWER CONVERTER

(71) Applicant: SEMICONDUCTOR COMPONENTS INDUSTRIES, LLC, Phoenix, AZ (US)

(72) Inventors: Jintae Kim, Seongnam-si (KR); Hangseok Choi, Yongin-si (KR); Taesung Kim, Seoul (KR); Sangcheol Moon, Bucheon-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/412,143

(22) Filed: May 14, 2019

(65) Prior Publication Data

US 2019/0267908 A1 Aug. 29, 2019

Related U.S. Application Data

(63) Continuation of application No. 15/706,928, filed on Sep. 18, 2017, now Pat. No. 10,333,416.

(60) Provisional application No. 62/402,311, filed on Sep. 30, 2016.

(51) Int. Cl.
*H02M 3/156* (2006.01)
*H02M 1/42* (2007.01)
*H02M 1/00* (2006.01)

(52) U.S. Cl.
CPC .. *H02M 1/4225* (2013.01); *H02M 2001/0025* (2013.01); *H02M 2003/1566* (2013.01)

(58) Field of Classification Search
CPC . H02M 2001/0025; H02M 2003/1566; H02M 1/4225; H02M 7/2176
See application file for complete search history.

(56) References Cited

U.S. PATENT DOCUMENTS

| | | | |
|---|---|---|---|
| 7,253,593 B1 | 8/2007 | Chen et al. | |
| 7,948,224 B2* | 5/2011 | Ng | H03F 3/217 |
| | | | 323/284 |
| 2006/0176098 A1 | 8/2006 | Chen et al. | |
| 2008/0272748 A1 | 11/2008 | Melanson | |
| 2009/0278516 A1* | 11/2009 | Bhagwat | H02M 3/1588 |
| | | | 323/270 |
| 2011/0260703 A1 | 10/2011 | Laur et al. | |
| 2012/0112711 A1 | 5/2012 | Zhang et al. | |
| 2013/0043849 A1* | 2/2013 | Pagano | H02M 3/156 |
| | | | 323/271 |

(Continued)

*Primary Examiner* — Harry R Behm
(74) *Attorney, Agent, or Firm* — AMPACC Law Group, PLLC

(57) ABSTRACT

A circuit for controlling a power converter includes a transient detector that generates a transient detection signal in response to a feedback signal indicating an output signal of the power converter, a gain selector that generates a gain selection signal in response to the transient detection signal, and an amplifier circuit that generates a comparison signal based on the value of the feedback signal, a value of a reference signal, and a gain value of the amplifier circuit, the gain value being adjusted in response to the gain selection signal. The transient detection signal indicates that a value of the feedback signal is in a first range and a specific condition of the feedback signal is detected.

20 Claims, 6 Drawing Sheets

(56) References Cited

U.S. PATENT DOCUMENTS

| | | | |
|---|---|---|---|
| 2014/0176107 A1* | 6/2014 | Yu | H02M 1/08 |
| | | | 323/285 |
| 2015/0077078 A1* | 3/2015 | Hsu | H02M 3/156 |
| | | | 323/282 |
| 2015/0146458 A1* | 5/2015 | Lim | H02M 3/158 |
| | | | 363/44 |
| 2015/0364996 A1 | 12/2015 | Mansri et al. | |
| 2017/0358984 A1 | 12/2017 | Unno | |
| 2018/0032096 A1* | 2/2018 | Beck | H02M 3/158 |

* cited by examiner

SYSTEM AND METHOD FOR CONTROLLING VOLTAGE CONTROL LOOP IN POWER CONVERTER

CROSS-REFERENCE TO RELATED APPLICATIONS

This application is a Continuation of U.S. patent application Ser. No. 15/706,928, filed on Sep. 18, 2017, which claims the benefit of U.S. Provisional Application No. 62/402,311 filed on Sep. 30, 2016, the entire contents of which are incorporated by reference herein in its entirety.

FIELD OF THE DISCLOSURE

The present disclosure relates to integrated circuit devices, and more particularly to a power converter.

BACKGROUND

When a load on an Alternating Current (AC) power source is not a linear load (i.e., the load is a non-linear load), the current being drawn from the AC power source may be out of phase with the voltage of the AC power source. A purely resistive load is a linear load. A load having an energy storage component (such as an inductance or a capacitance) may be a non-linear load. A load that draws power irregularly over the course of a cycle of the AC power source, such as a rectifier or a Switch Mode Power Supply (SMPS), may be a non-linear load.

When the current being drawn by a non-linear load from the AC power source is out of phase with the voltage of the AC power source, the current being drawn from the AC power source will be higher, on average, than it would be if the current and voltage were in phase. This can cause power to be wasted and damage to occur in the AC power source.

The degree to which the current drawn by a load from the AC power source is in phase with the voltage of the AC power source may be expressed as the Power Factor (PF) of the load. An ideal linear load has a PF of 1, and non-linear loads have a PF less than one.

A Power Factor Correction (PFC) circuit may be provided between an AC power source and a load. The PFC circuit operates to present a PF close to 1 (e.g., 0.98) to the AC power source by keeping the phase of current drawn from the AC power source close to the phase of the voltage of the AC power supply, even when the phase of the current drawn by the load is out of phase or irregular.

A power converter converts an input voltage into an output voltage and provides the output voltage to a load. The power converter may perform a PFC operation using a current control loop, which includes a PFC circuit. The power converter may regulate the output voltage at a substantially constant level using a voltage control loop. However, under a load transient condition, a relatively low bandwidth of the voltage control loop may lead to an overshoot or an undershoot of the output voltage.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

DETAILED DESCRIPTION

Figure 1:
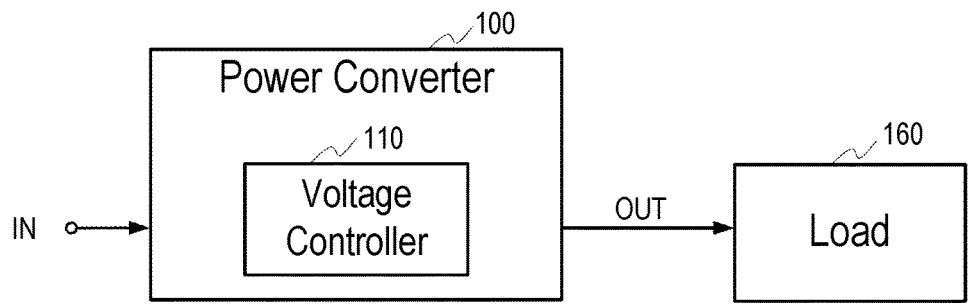
FIG. 1 illustrates a block diagram of a power converter according to an embodiment.

Embodiments relate to a circuit and a method for controlling a power converter.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

In an embodiment, a method for controlling a power converter includes determining whether a value of a feedback signal is in a first range, where the feedback signal indicates an output signal of the power converter. The method further includes detecting a plurality of points of the feedback signal and decreasing one or both of a proportional coefficient and an integral coefficient of a first control loop of the power converter at a first plurality of times corresponding to the detected plurality of points of the feedback signal when the value of the feedback signal is in the first range.

In an embodiment, the first plurality of times are respectively associated with a second plurality of times at which a slope of the feedback signal becomes substantially equal to zero.

FIG. 1 illustrates a power converter 100 according to an embodiment. The power converter 100 receives an input signal (e.g., an input voltage) IN and provides an output signal (e.g., an output voltage) OUT to a load 160.

The power converter 100 in FIG. 1 includes a voltage controller 110. The voltage controller 110 in FIG. 1 may be integrated in a semiconductor chip, and the semiconductor chip may be packaged by itself or together with one or more other semiconductor chips.

The load 160 in FIG. 1 may include one or more integrated chips (ICs). In an embodiment, the output signal OUT is used to supply power to a Central Processing Unit (CPU), a Graphics Processing Unit (GPU), an integrated memory circuit, a battery charger, a light emitting diode (LED), or other types of electrical load. In embodiments, the power converter 100 performs Power Factor Correction (PFC), and the load 160 includes a DC-to-DC converter such as a Switched-Mode Power Supply (SMPS).

Figure 2:
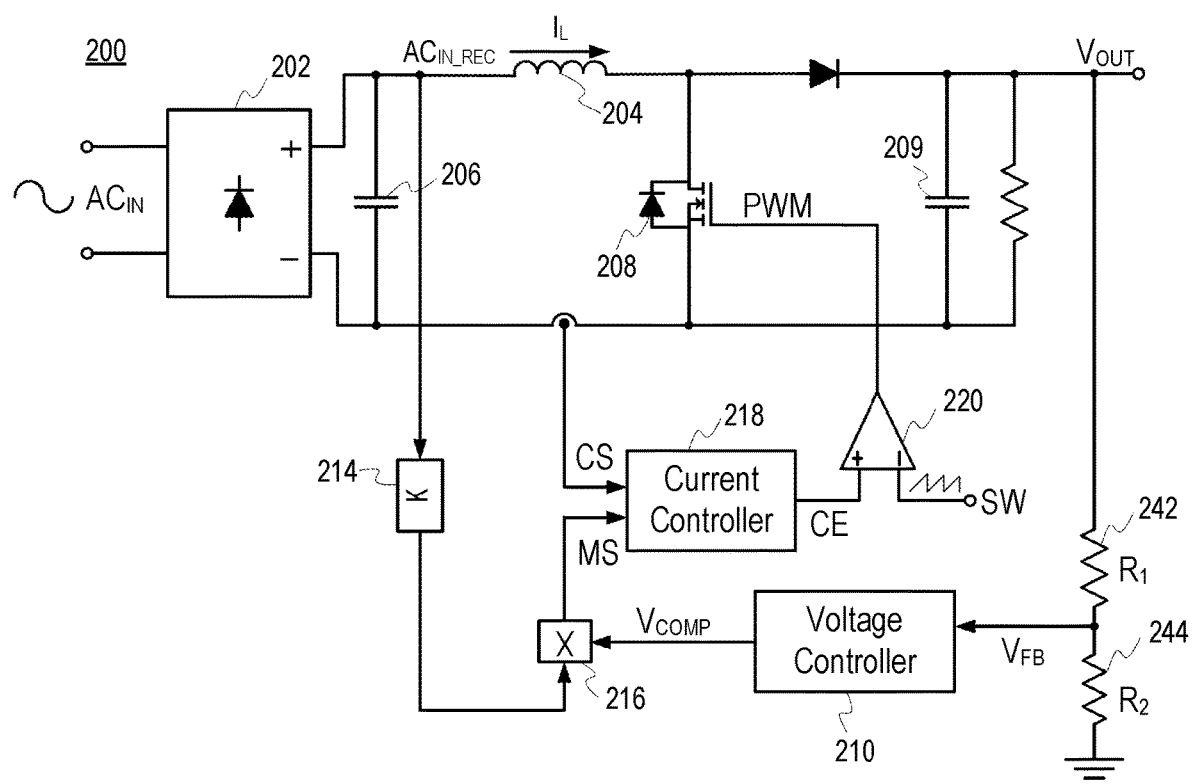
FIG. 2 illustrates a power converter suitable for use as the power converter of FIG. 1 according to an embodiment.

FIG. 2 illustrates a power converter 200 suitable for use as the power converter 100 of FIG. 1 according to an embodiment. The power converter 200 in FIG. 2 includes a rectifier 202, an inductor 204, a switching device 208, an output capacitor 209, a current controller 218, a pulse-width modulation (PWM) comparator 220, a scaling circuit 214, a multiplier 216, first and second resistors 242 and 244, and a voltage controller 210.

A power supply (not shown) provides an AC input signal $AC_{IN}$ to the rectifier 202, which inverts the negative halves of the received AC input signal $AC_{IN}$ to generate a rectified AC signal (or a rectified input voltage) $V_{IN\_REC}$. In an embodiment, the rectifier 202 is a full-wave bridge rectifier. The rectified input voltage $V_{IN\_REC}$ is applied to the inductor 204 of the power converter 200.

The scaling circuit 214 in FIG. 2 receives the rectified input voltage $V_{IN\_REC}$ and generates a scaled version of the rectified input voltage $V_{IN\_REC}$. In an embodiment, the scaling circuit 214 is a resistive voltage divider and generates a scaled-down version of the rectified input voltage $V_{IN\_REC}$.

The voltage controller 210 in FIG. 2 receives a feedback signal (or a feedback voltage) $V_{FB}$, which is generated from an output signal (e.g., an output voltage) $V_{OUT}$ using a voltage divider. In an embodiment, the voltage divider includes the first and second resistors 242 and 244 as shown in FIG. 2. The voltage controller 210 generates a comparison signal (or a comparison voltage) $V_{COMP}$, which has a value that is proportional to a difference between the feedback voltage $V_{FB}$ and a reference voltage.

The multiplier 216 in FIG. 2 multiplies the scaled version of the rectified input voltage $V_{IN\_REC}$ with a value of the comparison voltage $V_{COMP}$. The current controller 218 in FIG. 2 receives an output signal MS of the multiplier 216 and a current sense signal CS indicating a magnitude of an inductor current $I_L$, and generates a current error signal CE indicating a difference between the received signals MS and CS. The PWM comparator 220 in FIG. 2 compares the current error signal CE and a sawtooth waveform SW, and generates a PWM signal PWM according to the comparison result. The switching device 208 in FIG. 2 is turned on or off in response to the PWM signal PWM.

A current control loop in FIG. 2, which includes the scaling circuit 214, the multiplier 216, the current controller 218, and the PWM comparator 220, causes a waveform of the inductor current $I_L$ to follow the shape of the rectified input voltage $V_{IN\_REC}$, therefore a good power factor is obtained. A voltage control loop in FIG. 2, which includes the voltage controller 210 and the first and second resistors 242 and 244, regulates a level of the output voltage $V_{OUT}$ at a given level. In embodiments, a bandwidth of the voltage control loop is lower than a line frequency (e.g., 20 Hz or less) and a bandwidth of the current control loop is much higher than the bandwidth of the voltage control loop. For example, the bandwidth of the current control loop is greater than ten times of the line frequency and less than one-third of a switching frequency (e.g., 100 KHz.)

Figure 3:
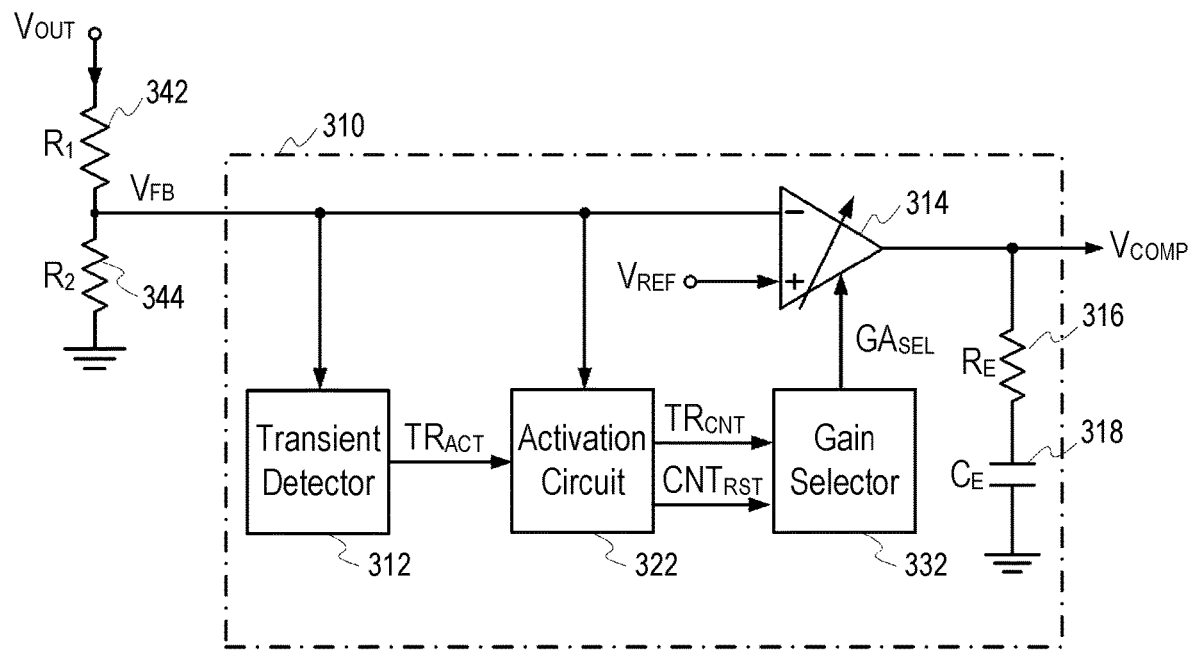
FIG. 3 illustrates a voltage controller suitable for use as a voltage controller of FIG. 2 according to an embodiment.

FIG. 3 illustrates a voltage controller 310 suitable for use as the voltage controller 210 of FIG. 2 according to an embodiment. The voltage controller 310 in FIG. 3 includes a transient detector 312, an activation circuit 322, a gain selector 332, an amplifier circuit 314, a resistor 316, and a capacitor 318. 310

The transient detector 312 in FIG. 3 receives a feedback voltage $V_{FB}$ (e.g., the feedback voltage $V_{FB}$ of FIG. 2) and generates a transient detection signal $TR_{ACT}$. In an embodiment, the transient detection signal $TR_{ACT}$ having a first logic value (e.g., a logic high value) indicates that the feedback voltage $V_{FB}$ is within a given range and a specific condition of the feedback voltage $V_{FB}$ is detected. For example, the specific condition of the feedback voltage $V_{FB}$ may be that a slope of the feedback voltage $V_{FB}$ becomes substantially equal to zero.

The activation circuit 322 in FIG. 3 receives the transient detection signal $TR_{ACT}$ and the feedback voltage $V_{FB}$ and generates a counter activation signal $TR_{CNT}$ and a counter reset signal $CNT_{RST}$. In an embodiment, the counter activation signal $TR_{CNT}$ functions as a clock signal of a counter to change a value stored in the counter.

The gain selector 332 in FIG. 3 receives the counter activation signal $TR_{CNT}$ and the counter reset signal $CNT_{RST}$ and generates a gain selection signal $GA_{SEL}$. In an embodiment, the gain selector 332 changes a value of the gain selection signal $GA_{SEL}$ in response to an edge of the counter activation signal $TR_{CNT}$.

The amplifier circuit 314 in FIG. 3 receives the feedback voltage $V_{FB}$ and a reference voltage $V_{REF}$, and generates a current that has a magnitude determined by a gain value of the amplifier circuit 314 and a difference between the feedback voltage $V_{FB}$ and the reference voltage $V_{REF}$. The gain value of the amplifier circuit 314 is determined according to a value of the gain selection signal $GA_{SEL}$. In an embodiment, the amplifier circuit 314 is a single amplifier, and the gain value of the amplifier is decreased when the value of the gain selection signal $GA_{SEL}$ increases. In another embodiment, the amplifier circuit 314 includes a plurality of transconductance amplifiers (not shown) connected in parallel to each other, and a number of turned on amplifiers among the plurality of transconductance amplifiers is decreased when the value of the gain selection signal $GA_{SEL}$ increases, leading to a decrease in the gain value of the amplifier circuit 314.

In a voltage control loop of FIG. 3, which includes the voltage controller 310, a proportional coefficient P of the voltage control loop can be represented by Equation 1:

$$P = g_m \times \frac{V_{REF}}{V_{OUT}} \times R_e. \qquad \text{Equation 1}$$

In Equation 1, $g_m$ is the gain value of the amplifier circuit 314, $R_e$ is a resistance value of the resistor 316, and $V_{OUT}$ is a level of an output voltage (e.g., the output voltage $V_{OUT}$ of FIG. 2).

An integral coefficient I of the voltage control loop can be represented by Equation 2:

$$I = g_m \times \frac{V_{REF}}{V_{OUT}} \times \frac{1}{C_e}. \qquad \text{Equation 2}$$

In Equation 2, $C_e$ is a capacitance value of the capacitor 318. As shown in Equations 1 and 2, when the gain value $g_m$ of the amplifier circuit 314 is decreased, one or both of the proportional coefficient P and the integral coefficient I are also decreased.

Although the voltage control loop according to the embodiment shown in FIG. 3 includes both the resistor 316 and the capacitor 318, embodiments of the present disclosure are not limited thereto. In another embodiment, the resistor 316 may be omitted in the voltage control loop, and the integral coefficient I of the voltage control loop can be decreased when the gain value $g_m$ of the amplifier circuit 314 is decreased.

In addition, although the voltage control loop according to the embodiment shown in FIG. 3 is implemented using analog circuit components, embodiments of the present disclosure are not limited thereto. In another embodiment, the voltage control loop may be implemented using digital circuit components (not shown), for example, a digital PI controller, and either or both of a proportional coefficient and an integral coefficient can be adjusted in response to the gain selection signal $GA_{SEL}$.

Figure 4:
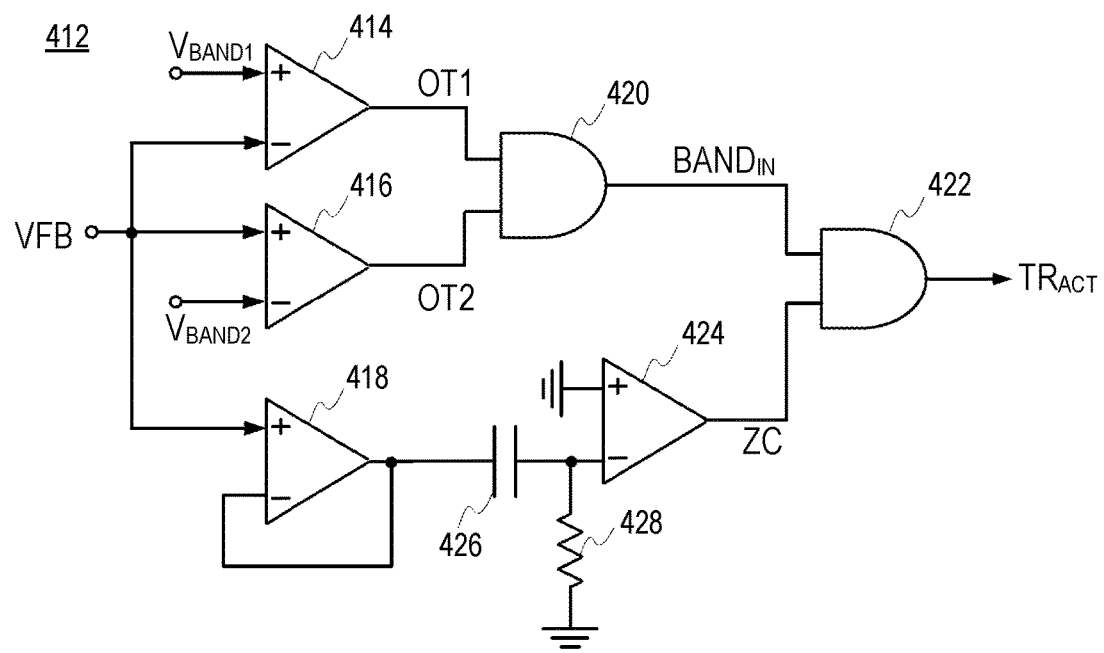
FIG. 4 illustrates a transient detector suitable for use as a transient detector of FIG. 3 according to an embodiment.

FIG. 4 illustrates a transient detector 412 suitable for use as the transient detector 312 of FIG. 3 according to an embodiment. The transient detector 412 in FIG. 4 includes first and second comparators 414 and 416, first and second logic gates 420 and 422, a buffer 418, a coupling capacitor 426, a resistor 428, and a zero-crossing detection (ZCD) comparator 424.

The first comparator 414 in FIG. 4 has a non-inverting input receiving a first upper threshold signal (e.g., a first upper threshold voltage) $V_{BAND1}$ and an inverting input receiving a feedback signal (e.g., a feedback voltage) $V_{FB}$. The first comparator 414 generates a first output signal OT1 indicating a first logic value (e.g., a logic high value) when the first upper threshold voltage $V_{BAND1}$ is equal to or greater than the feedback voltage $V_{FB}$.

The second comparator 416 in FIG. 4 has a non-inverting input receiving the feedback voltage $V_{FB}$ and an inverting input receiving a first lower threshold signal (e.g., a first lower threshold voltage) $V_{BAND2}$. The second comparator 416 generates a second output signal OT2 indicating a first logic value (e.g., a logic high value) when the feedback voltage $V_{FB}$ is equal to or greater than the first lower threshold voltage $V_{BAND2}$.

The first logic gate (e.g., a first AND gate) 420 in FIG. 4 receives the first and second output signals OT1 and OT2 respectively from the first and second comparators 414 and 416, and performs a logical AND operation on the first and second output signals OT1 and OT2 to generate a range signal $BAND_{IN}$. The range signal $BAND_{IN}$ indicates whether the feedback voltage $V_{FB}$ is within a range between the first upper threshold voltage $V_{BAND1}$ and the first lower threshold voltage $V_{BAND2}$. In an embodiment, the range signal $BAND_{IN}$ has a first logic value (e.g., a logic high value) when the feedback voltage $V_{FB}$ is within the range between the first upper and lower threshold voltages $V_{BAND1}$ and $V_{BAND2}$, and has a second logic value (e.g., a logic low value) when the feedback voltage $V_{FB}$ is out of the range.

The buffer 418 in FIG. 4 has a unity gain and has a non-inverting input receiving the feedback voltage $V_{FB}$. The buffer 418 makes a voltage level at an output substantially equal to a level of the feedback voltage $V_{FB}$.

The coupling capacitor 426 in FIG. 4 has a first end connected to the output of the buffer 418, and a second end connected to the resistor 428 and an inverting input of the ZCD comparator 424. The coupling capacitor 426 passes AC components of the feedback voltage $V_{FB}$ and blocks a DC component of the feedback voltage $V_{FB}$.

The ZCD comparator 424 has a non-inverting input connected to a ground, and generates a ZCD signal ZC indicating a plurality of specific points of the feedback voltage $V_{FB}$. In an embodiment, the plurality of specific points of the feedback voltage $V_{FB}$ are respectively associated with a plurality of times at which a slope of the feedback voltage $V_{FB}$ becomes substantially equal to zero. For example, the feedback voltage $V_{FB}$ has peaks at the plurality of times, and the slope of the feedback voltage $V_{FB}$ becomes substantially equal to zero when the slope of the feedback voltage $V_{FB}$ has a magnitude that is equal to or less than 0.1 V/s, 0.3 V/s, 0.5 V/s, 1 V/s, 5 V/s, or 10 V/s. In the embodiment shown in FIG. 4, when the feedback voltage $V_{FB}$ has a peak at a first time, the ZCD signal ZC transitions from a first logic value (e.g., a logic low value) to a second logic value (e.g., a logic high value) at a second time corresponding to a sum of the first time and a given delay amount. For example, the given delay amount is determined based on a resistance value of the resistor 428 and a capacitance value of the coupling capacitor 426.

The second logic gate (e.g., a second AND gate) 422 in FIG. 4 receives the range signal $BAND_{IN}$ and the ZCD signal ZC, and generates a transient detection signal $TR_{ACT}$. In an embodiment, the transient detection signal $TR_{ACT}$ having a first logic value (e.g., a logic high value) indicates that the feedback voltage $V_{FB}$ is within the range between the first upper and lower threshold voltages $V_{BAND1}$ and $V_{BAND2}$, and a specific point of the feedback voltage $V_{FB}$ is detected.

Figure 5:
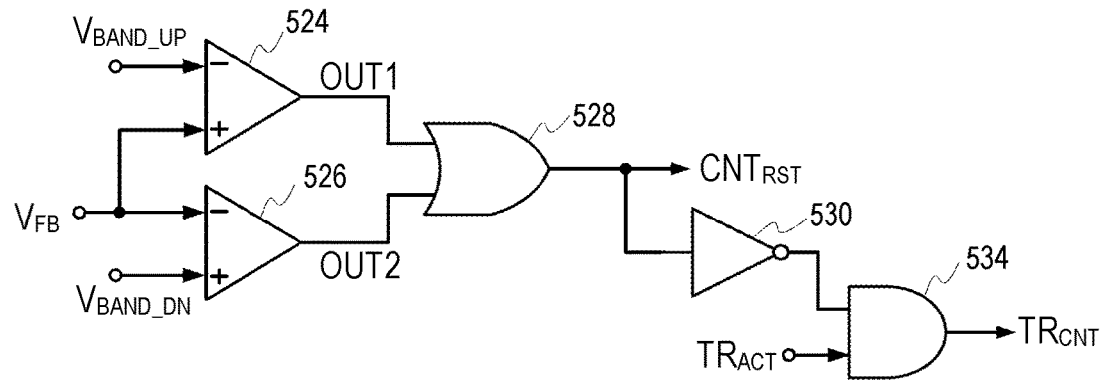
FIG. 5 illustrates an activation circuit suitable for use as an activation circuit of FIG. 3 according to an embodiment.

FIG. 5 illustrates an activation circuit 522 suitable for use as the activation circuit 322 of FIG. 3 according to an embodiment. The activation circuit 522 includes first and second comparators 524 and 526, a first logic gate 528, an inverter 530, a second logic gate 534.

The first comparator 524 in FIG. 5 receives has an inverting input receiving a first limit signal (e.g., a second upper threshold voltage) $V_{BAND\_UP}$ and a non-inverting input receiving the feedback voltage $V_{FB}$. The first comparator 524 generates a first output signal OUT1 indicating a first logic value (e.g., a logic high value) when the feedback voltage $V_{FB}$ exceeds the second upper threshold voltage $V_{BAND\_UP}$ and a second logic value (e.g., a logic low value) when the feedback voltage $V_{FB}$ is less than the second upper threshold voltage $V_{BAND\_UP}$.

The second comparator 526 in FIG. 5 receives has a non-inverting input receiving a second limit signal (e.g., a second lower threshold voltage) $V_{BAND\_DN}$ and an inverting input receiving the feedback voltage $V_{FB}$. The second comparator 526 generates a second output signal OUT2 indicating a first logic value (e.g., a logic high value) when the feedback voltage $V_{FB}$ is less than the second lower threshold voltage $V_{BAND\_DN}$ and a second logic value (e.g., a logic low value) when the feedback voltage $V_{FB}$ is equal to or greater than the second lower threshold voltage $V_{BAND\_DN}$.

The first logic gate (e.g., an OR gate) 528 in FIG. 5 receives the first and second output signals OUT1 and OUT2 respectively from the first and second comparators 524 and 526, and performs a logical OR operation on the first and second output signals OUT1 and OUT2 to generate a counter reset signal $CNT_{RST}$. In an embodiment, the counter reset signal $CNT_{RST}$ has a specific logic value (e.g., a logic high value) when the feedback voltage $V_{FB}$ exceeds the second upper threshold voltage $V_{BAND\_UP}$ or the feedback voltage $V_{FB}$ is less than the second lower threshold voltage $V_{BAND\_DN}$.

The inverter 530 in FIG. 5 receives the counter reset signal $CNT_{RST}$ and provides an inverted version of the counter reset signal $CNT_{RST}$ to the second logic gate 534. The second logic gate (e.g., an AND gate) 534 receives the inverted version of the counter reset signal $CNT_{RST}$ and the transient detection signal $TR_{ACT}$, and performs a logical AND operation on the received signals $CNT_{RST}$ and $TR_{ACT}$ to generate a counter activation signal $TR_{CNT}$.

Figure 6:
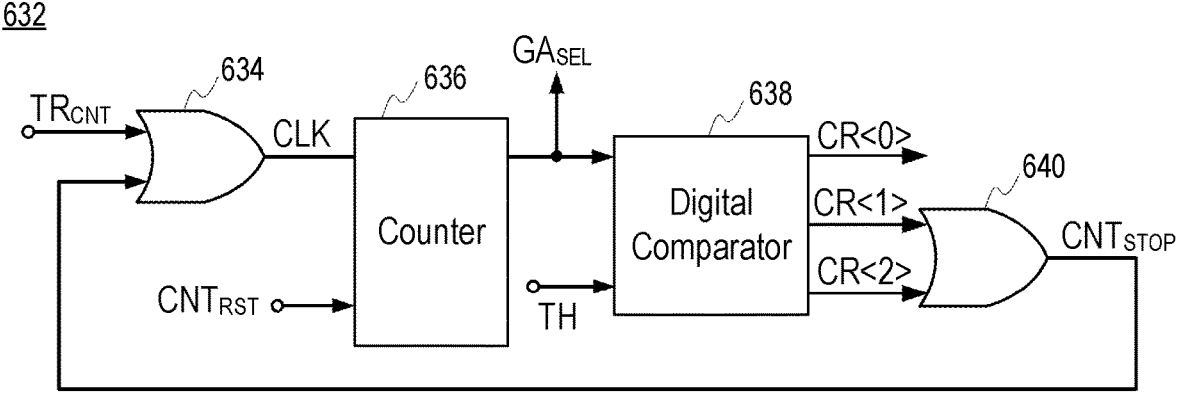
FIG. 6 illustrates a gain selector suitable for use as a gain selector of FIG. 3 according to an embodiment.

FIG. 6 illustrates a gain selector 632 suitable for use as the gain selector 332 of FIG. 3 according to an embodiment. The gain selector 632 includes a first logic gate 634, a counter 636, a digital comparator 638, and a second logic gate 640.

The first logic gate (e.g., an OR gate) 634 in FIG. 6 receives the counter activation signal $TR_{CNT}$ and a counter stop signal $CNT_{STOP}$, and performs a logical OR operation on the received signals $TR_{CNT}$ and $CNT_{STOP}$ to generate a clock signal CLK. In an embodiment, when the counter stop signal $CNT_{STOP}$ has a logic high value, the clock signal CLK has a logic high value regardless of a value of the counter activation signal $TR_{CNT}$.

The counter 636 in FIG. 6 receives the clock reset signal $CNT_{RST}$ and the clock signal CLK, and generates a gain selection signal $GA_{SEL}$ in response to the received signals $CNT_{RST}$ and CLK. In an embodiment, the counter 636 is an up counter and increases a value of the gain selection signal $GA_{SEL}$ in response to a rising edge of the clock signal CLK when the clock reset signal $CNT_{RST}$ has a first logic value (e.g., a logic low value). The up counter 636 is reset when the clock reset signal $CNT_{RST}$ has a second logic value (e.g., a logic high value).

The counter 636 in FIG. 6 receives the clock reset signal $CNT_{RST}$ and the clock signal CLK, and generates a gain selection signal $GA_{SEL}$ in response to the received signals $CNT_{RST}$ and CLK. In an embodiment, the counter 636 is an up counter and increases a value of the gain selection signal $GA_{SEL}$ in response to a rising edge of the clock signal CLK when the clock reset signal $CNT_{RST}$ has a first logic value (e.g., a logic low value). The up counter 636 is reset when the clock reset signal $CNT_{RST}$ has a second logic value (e.g., a logic high value).

The value of the gain selection signal $GA_{SEL}$ is used to adjust a gain value of an amplifier circuit (e.g., the amplifier circuit 314 of FIG. 3). In an embodiment, the amplifier circuit includes a plurality of transconductance amplifiers connected in parallel to each other, and each of the plurality of transconductance amplifiers has a positive input receiving a feedback voltage (e.g., the feedback voltage $V_{FB}$ of FIG. 3) and a negative terminal receiving a reference voltage (e.g. the reference voltage $V_{REF}$ of FIG. 3). In this embodiment, a number of turned on amplifiers among the plurality of transconductance amplifiers is decreased when the value of the gain selection signal $GA_{SEL}$ increases. As a result, the gain value of the amplifier circuit is decreased. In another embodiment, the amplifier circuit is a variable-gain non-linear amplifier including a plurality of transconductance amplifiers, as will be described below with reference to FIG. 7.

The digital comparator 638 in FIG. 6 compares the gain selection signal $GA_{SEL}$ to a threshold signal TH, and generates first, second, and third output signals CR<0>, CR<1>, and CR<2> according to the comparison result. In an embodiment, the first output signal CR<0> has a logic high value when the gain selection signal $GA_{SEL}$ has a value less than the threshold signal TH, the second output signal CR<1> has a logic high value when the gain selection signal $GA_{SEL}$ has a value equal to the threshold signal TH, and the third output signal CR<1> has a logic high value when the gain selection signal $GA_{SEL}$ has a value greater than the threshold signal TH.

The second logic gate (e.g., an OR gate) 640 in FIG. 6 receives the second and third output signals CR<1> and CR<2>, and performs a logical OR operation on the received signals CR<1> and CR<2>. As a result, when the gain selection signal $GA_{SEL}$ reaches a given value of the threshold signal TH, the second logic gate 640 generates the counter stop signal $CNT_{STOP}$ having a first logic value (e.g., a logic high value). The first logic gate 634 generates the clock signal CLK having a logic high value regardless of the value of the counter activation signal $TR_{CNT}$, and thus the counter 636 ceases to change the value of the gain selection signal $GA_{SEL}$.

Figure 7:
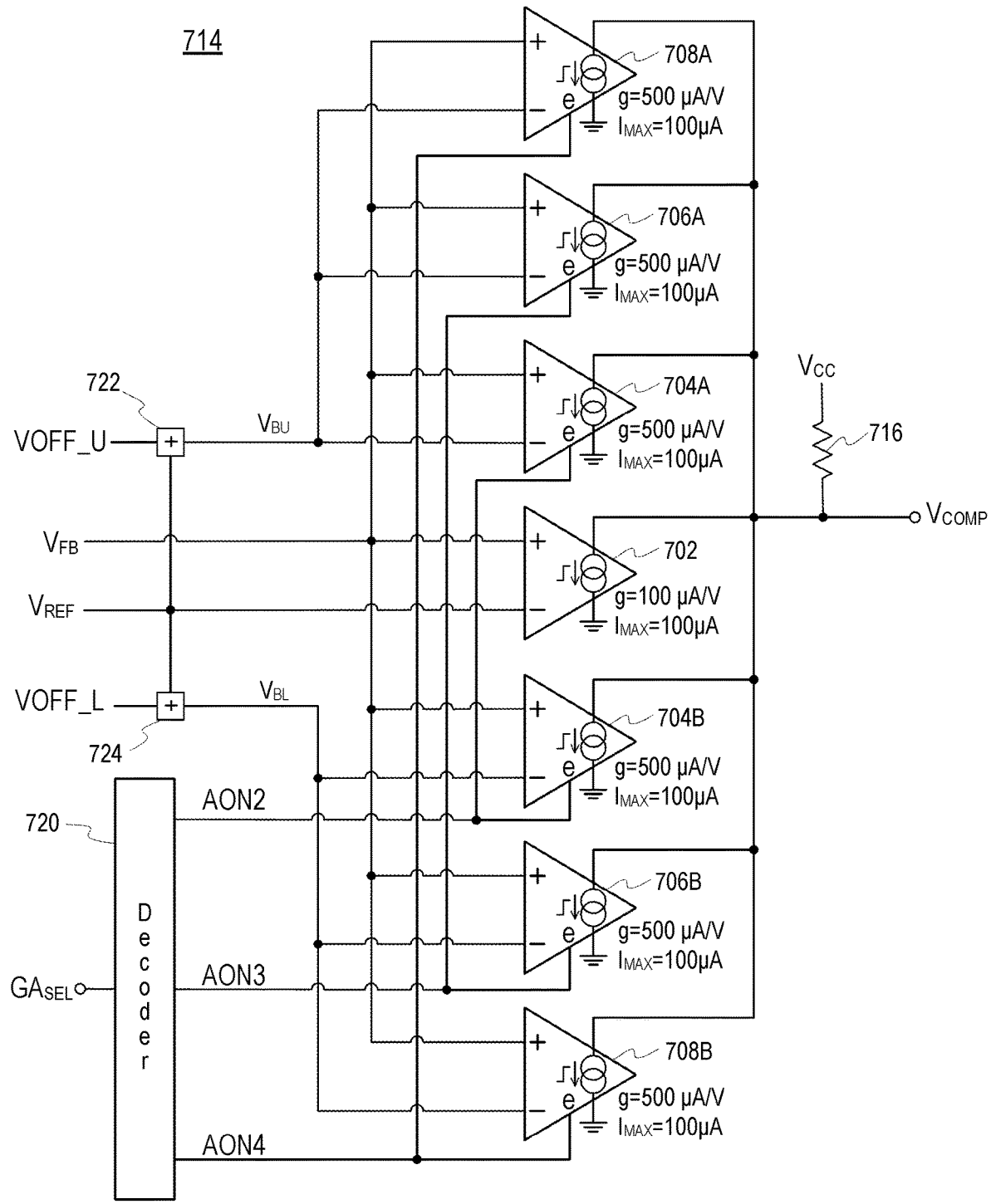
FIG. 7 is a circuit drawing of a variable-gain non-linear amplifier suitable for use as an amplifier circuit of FIG. 3 according to an embodiment.

FIG. 7 is a circuit drawing of a variable-gain non-linear amplifier 714 (hereinafter, amplifier 714) according to an embodiment. The amplifier 714 is suitable for use as the amplifier circuit 314 of FIG. 3.

The amplifier 714 in FIG. 7 includes a plurality of transconductance amplifiers, including a first transconductance amplifier 702, upper and lower second transconductance amplifiers 704A and 704B, upper and lower third transconductance amplifiers 706A and 706B, and upper and lower fourth transconductance amplifiers 708A and 708B. Each of the plurality of transconductance amplifiers, when enabled, sinks a current according to a difference between its positive and negative inputs, according to:

$$I_{OUT} = \begin{cases} 0, & INP < INN \\ \text{MIN}(I_{MAX}, g \times (INP - INN)), & INP \geq INN \end{cases} \quad \text{Equation 3}$$

wherein $I_{OUT}$ is the magnitude of the output current, INP is the voltage on the positive (+) input, INN is the voltage on the negative (−) input, g is the transconductance gain in amps per volt, and $I_{MAX}$ is a maximum current the transconductance amplifier can sink.

The first transconductance amplifier 702 is always enabled. The second transconductance amplifiers 704A and 704B are enabled according to a second amplifier enable signal AON2, the third transconductance amplifiers 706A and 706B are enabled according to a third amplifier enable signal AON3, and the fourth transconductance amplifiers 708A and 708B are enabled according to a fourth amplifier enable signal AON4.

The second, third, and fourth amplifier enable signals AON2, AON3, and AON4 are asserted by a decoder 720 according to values of the amplifier gain selection signal $GA_{SEL}$. In an embodiment, the second amplifier enable signal AON2 is asserted at all times, the third amplifier enable signal AON3 is asserted when the amplifier gain selection signal $GA_{SEL}$ is less than a first threshold value, and both the third and fourth amplifier enable signals AON3 and AON4 are asserted when the amplifier gain selection signal $GA_{SEL}$ is less than a second threshold value. Accordingly, either 1, 2, or 3 of the amplifier enable signals is asserted, depending on the value of the amplifier gain selection signal $GA_{SEL}$.

In the embodiment of FIG. 7, the gain g of the first transconductance amplifier 702 is 100 µA/V, and the remaining transconductance amplifiers have gains of 500 µA/V, so that the combined gains of the remaining transconductance amplifiers (that is, the enablable amplifiers) may be 500, 1000, or 1500 µA/V, depending on how many of the enablable amplifiers are turned on. But embodiments of the present disclosure are not limited thereto.

The negative input of the first transconductance amplifier 702 is coupled to a reference voltage $V_{REF}$. Negative inputs of the upper second, third, and fourth transconductance amplifiers 704A, 706A, and 708A are coupled to an upper band reference voltage $V_{BU}$. The negative inputs of the lower second, third, and fourth transconductance amplifiers 704B, 706B, and 708B are coupled to a lower band reference voltage $V_{BL}$. Positive inputs of all of the transconductance amplifiers are coupled to a feedback voltage $V_{FB}$.

The upper and lower band reference voltages $V_{BU}$ and $V_{BL}$ are selected so that the gain of the amplifier 714 is determined by the lower second, third, and fourth transconductance amplifiers 704B, 706B, and 708B when the feedback voltage $V_{FB}$ is less than a lower threshold voltage $V_{BAND2}$, determined by the first transconductance amplifier 702 when the feedback voltage $V_{FB}$ is greater than the lower threshold voltage $V_{BAND2}$ and less than an upper threshold voltage $V_{BAND1}$, and determined by the upper second, third, and fourth transconductance amplifiers 704A, 706A, and 708A when the feedback voltage $V_{FB}$ is less than a lower threshold voltage $V_{BAND2}$.

In an embodiment, this behavior is produced by selecting the lower band reference voltage $V_{BL}$ so that the lower second, third, and fourth transconductance amplifiers 704B, 706B, and 708B hit their maximum current $I_{MAX}$ when the feedback voltage $V_{FB}$ is equal to the lower threshold voltage $V_{BAND2}$, by selecting the reference voltage $V_{REF}$ so that the first transconductance amplifier 702 begins sinking current when the feedback voltage $V_{FB}$ is equal to the lower threshold voltage $V_{BAND2}$, and by selecting the upper band reference voltage $V_{BU}$ so that the upper second, third, and fourth transconductance amplifiers 704A, 706A, and 708A begins sinking current when the feedback voltage $V_{FB}$ is equal to the upper threshold voltage $V_{BAND1}$:

$$V_{BL}=V_{BAND2}-I_{MAX}/g, \quad \text{Equation 4}$$

$$V_{REF}=V_{BAND2}, \quad \text{Equation 5}$$

$$V_{BU}=V_{BAND1}, \quad \text{Equation 6}$$

wherein $I_{MAX}$ is the maximum current that each of the transconductance amplifiers is capable of sinking, and g is the gain of each of the lower second, third, and fourth transconductance amplifiers 704B, 706B, and 708B.

The currents of all the enabled amplifiers are summed into a total current $I_{SUM}$, which produces the comparison voltage $V_{COMP}$ according to:

$$V_{COMP}=Vcc-(I_{SUM} \times R), \quad \text{Equation 7}$$

wherein R is a resistance value of the resistor 716 shown in FIG. 7.

As a result, the amplifier 714 produces a comparison voltage $V_{COMP}$ according to:

$$V_{COMP} = \begin{cases} Vcc, & V_{FB} < V_{BL} \\ Vcc - R(Ng(V_{FB} - V_{BL})), & V_{BL} \le V_{FB} < V_{REF} \\ Vcc - R(g_1(V_{FB} - V_{REF}) + NI_{MAX}), & V_{REF} \le V_{FB} < V_{BU} \\ Vcc - R(Ng(V_{FB} - V_{BU}) + g_1(V_{FB} - V_{REF}) + NI_{MAX}), & V_{BU} \le V_{FB} < V_{BU} + V_{MI} \\ Vcc - R(2N+1)I_{MAX}, & V_{BU} + V_{MI} \le V_{FB} \end{cases} \quad \text{Eq. 8}$$

wherein R is the resistance of the resistor 716, N is the number of amplifier enable signals AON2, AON3, and AON4 that are asserted, g is the gain of each of the enablable transconductance amplifiers 704A, 704B, 706A, 706B, 708A, and 708B, $g_1$ is the gain of the first transconductance amplifier 702, and $I_{MAX}$ is the maximum current that each of the transconductance amplifiers can sink, and $V_{MI}$ is a voltage difference on the inputs of the enablable amplifiers correspond to $I_{MAX}$ and equals $I_{MAX}/g$.

In the embodiment of FIG. 7, the upper band reference voltage $V_{BU}$, and the lower band reference voltage $V_{BL}$ are produced using first and second adders 722 and 724 by adding an upper offset voltage VOFF_U and a lower offset voltage VOFF_L to the reference voltage $V_{REF}$, respectively.

Figure 8:
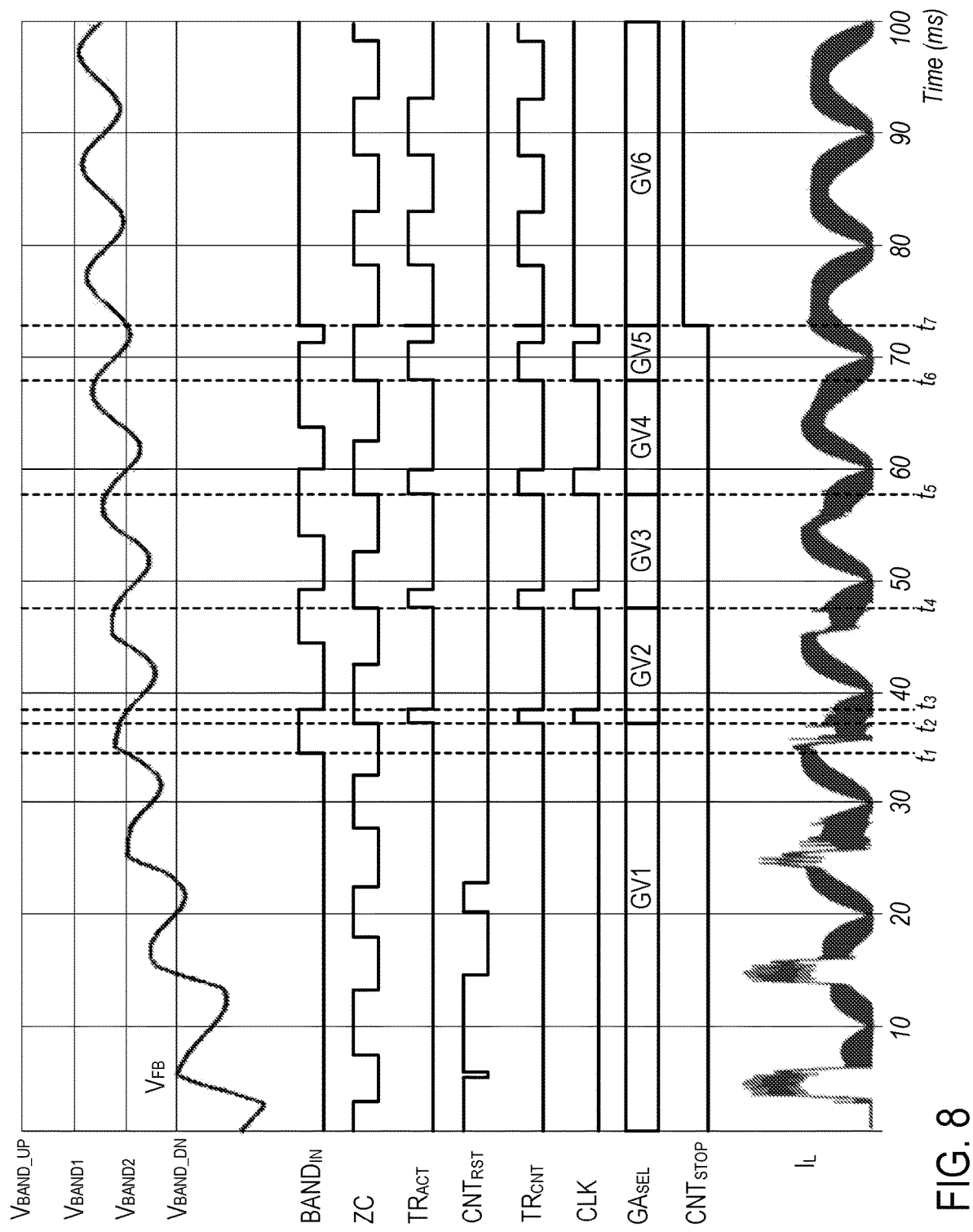
FIG. 8 illustrates an operation of a voltage controller (e.g., the voltage controller of FIG. 3) according to an embodiment.

FIG. 8 illustrates an operation of a voltage controller (e.g., the voltage controller 210 of FIG. 2) according to an embodiment. The figure shows example waveforms of a feedback voltage $V_{FB}$ (e.g., the feedback voltage $V_{FB}$ in FIG. 3), a range signal $BAND_{IN}$ (e.g., the range signal $BAND_{IN}$ in FIG. 4), a ZCD detection signal ZC (e.g., the ZCD detection signal ZC in FIG. 4), a transient detection signal $TR_{ACT}$ (e.g., the transient detection signal $TR_{ACT}$ in FIG. 4), a counter reset signal $CNT_{RST}$ (e.g., the counter reset signal $CNT_{RST}$ in FIG. 5), a counter activation signal $TR_{CNT}$ (e.g., the counter activation signal $TR_{CNT}$ in FIG. 5), a gain selection signal $GA_{SEL}$ (e.g., the gain selection signal $GA_{SEL}$ in FIG. 6), a counter stop signal $CNT_{STOP}$ (e.g., the counter stop signal $CNT_{STOP}$ in FIG. 6), and an inductor current $I_L$ (e.g., the inductor current $I_L$ in FIG. 2).

At a first time $t_1$ in FIG. 8, the feedback voltage $V_{FB}$ becomes substantially equal to a first lower threshold voltage $V_{BAND2}$ (e.g., the first lower threshold voltage $V_{BAND2}$ in FIG. 4). For example, the feedback voltage $V_{FB}$ becomes substantially equal to the first lower threshold voltage $V_{BAND2}$ when a difference between the feedback voltage $V_{FB}$ and the first lower threshold voltage $V_{BAND2}$ becomes equal to or less than a predetermined percentage (e.g., 0.1%, 0.5%, 1%, 3%, 5%, or 10%) of a level of the first lower threshold voltage $V_{BAND2}$. The second comparator 416 in FIG. 4 provides the second output signal OT2 having a first logic value (e.g., a high logic value) to the AND gate 420 in FIG. 4. Because the feedback voltage $V_{FB}$ is less than a first upper threshold voltage $V_{BAND1}$ (e.g., the first upper threshold voltage $V_{BAND1}$ in FIG. 4), the first comparator 414 in FIG. 4 provides the first output signal OT1 indicating a first logic value (e.g., a logic high value) to the AND gate 420. As a result, the AND gate 420 in FIG. 4 generates the range signal $BAND_{IN}$ having a first logic value (e.g., a logic high value).

At a second time $t_2$ in FIG. 8, a voltage at the second end of the coupling capacitor 426 in FIG. 4 crosses a zero voltage, and thus the ZCD comparator 424 in FIG. 4 generates the ZCD signal ZC having a first logic value (e.g., a logic high value). In the embodiment shown in FIG. 4, a delay amount between the second time $t_2$ and a time corresponding to an immediately preceding peak of the feedback voltage $V_{FB}$ is determined according to the resistance value of the resistor 428 and the capacitance value of the coupling capacitor 426. As a result, the AND gate 422 in FIG. 4 generates the transient detection signal $TR_{ACT}$ having a first logic value (e.g., a logic high value). Because the feedback voltage $V_{FB}$ remains between the second upper threshold voltage $V_{BAND\_UP}$ and the second lower threshold voltage $V_{BAND\_DN}$, the OR gate 528 in FIG. 5 continues to generate the counter reset signal $CNT_{RST}$ having a second logic value (e.g., a logic low value). The inverter 530 in FIG. 5 provides the inverted version of the counter reset signal $CNT_{RST}$ having a first logic value (e.g., a logic high value) to the AND gate 534 in FIG. 5. The AND gate 534 receives the inverted version of the counter reset signal $CNT_{RST}$ and the transient detection signal $TR_{ACT}$, and generates the counter activation signal $TR_{CNT}$ having a first logic value (e.g., a logic high value). The OR gate 634 in FIG. 6 receives the counter activation signal $TR_{CNT}$ having the first logic value and a counter stop signal $CNT_{STOP}$ having a second logic value (e.g., a logic low value). As a result, the OR gate 634 provides the clock signal CLK, which transitions from a second logic value (e.g., a logic low value) to a first logic value (e.g., a logic high value), to the counter 636 in FIG. 6. The counter 636 changes the value of the gain selection signal $GA_{SEL}$ from a first value GV1 to a second value GV2 in response to a first rising edge of the clock signal CLK, leading to a decrease in the gain value of the amplifier circuit 314 in FIG. 3 by a first given amount.

At a fourth time t4 in FIG. 8, the voltage at the second end of the coupling capacitor 426 in FIG. 4 crosses the zero voltage, and thus the ZCD comparator 424 in FIG. 4 generates the ZCD signal ZC having a first logic value (e.g., a logic high value). The AND gate 422 in FIG. 4 generates the transient detection signal $TR_{ACT}$ having a first logic value (e.g., a logic high value), and the AND gate 534 in FIG. 5 generates the counter activation signal $TR_{CNT}$ having a first logic value (e.g., a logic high value). As a result, the counter 636 in FIG. 6 changes the value of the gain selection signal $GA_{SEL}$ from the second value GV2 to a third value GV3 in response to a second rising edge of the clock signal CLK, leading to a decrease in the gain value of the amplifier circuit 314 in FIG. 3 by a second given amount.

At a fifth time $t_5$ in FIG. 8, the voltage at the second end of the coupling capacitor 426 in FIG. 4 crosses the zero voltage. As a result, the counter 636 in FIG. 6 changes the value of the gain selection signal $GA_{SEL}$ from the third value GV3 to a fourth value GV4 in response to a third rising edge of the clock signal CLK, leading to a decrease in the gain value of the amplifier circuit 314 in FIG. 3 by a third given amount.

At a sixth time $t_6$ in FIG. 8, the voltage at the second end of the coupling capacitor 426 in FIG. 4 crosses the zero voltage. As a result, the counter 636 in FIG. 6 changes the value of the gain selection signal $GA_{SEL}$ from the fourth value GV4 to a fifth value GV5 in response to a fourth rising edge of the clock signal CLK, leading to a decrease in the gain value of the amplifier circuit 314 in FIG. 3 by a fourth given amount.

At a seventh time t7 in FIG. 8, the feedback voltage $V_{FB}$ exceeds the first lower threshold voltage $V_{BAND2}$, and thus the range signal $BAND_{IN}$ has a first logic value (e.g., the logic high value). Because the ZCD signal ZC has a first logic value (e.g., the logic high value), the AND gate 422 in FIG. 4 generates the transient detection signal $TR_{ACT}$ having a first logic value (e.g., a logic high value). As a result, the counter 636 in FIG. 6 changes the value of the gain selection signal $GA_{SEL}$ from the fifth value GV5 to a sixth value GV6 in response to a fifth rising edge of the clock signal CLK, leading to a decrease in the gain value of the amplifier circuit 314 in FIG. 3 by a fifth given amount. The sixth value GV6 of the gain selection signal $GA_{SEL}$ reaches a given value (e.g., a value of the threshold signal TH in FIG. 6), and thus the digital comparator 638 in FIG. 6 generates the second output signal CR<1> having a first logic value (e.g., a logic high value). The OR gate 640 in FIG. 6 generates the counter stop signal $CNT_{STOP}$ having a first logic value (e.g., a logic high value), thereby deactivating the counter 636 in FIG. 6.

In the embodiment shown in FIG. 8, the value of the gain selection signal $GA_{SEL}$ is changed from the first value GV1 to the sixth value GV6, such that the corresponding gain value of the amplifier circuit 314 in FIG. 3 is gradually and discretely decreased. When the gain value of the amplifier circuit 314 is decreased, one or both of a proportional coefficient and an integral coefficient of a voltage control loop including a voltage controller (e.g., the voltage controller 210 in FIG. 2) are also decreased, leading to a decrease in a bandwidth of the voltage control loop. For example, first, second, third, fourth, fifth, and sixth gain values of the amplifier circuit 314 respectively corresponding to the first, second, third, fourth, fifth, and sixth values GV1, GV2, GV3, GV4, GV5, and GV6 of the gain selection signal $GA_{SEL}$ make the bandwidth of the voltage control loop 600-700 Hz, 300-400 Hz, 150-200 Hz, 100-130 Hz, 50-60 Hz, 10-30 Hz, respectively.

Although the embodiment shown in FIG. 6 uses six gain values GV1 to GV6 of the gain selection signal $GA_{SEL}$, embodiments of the present disclosure are not limited thereto. In an embodiment, the number of gain values of the gain selection signal $GA_{SEL}$ may be any natural number in a range from 3 to 10.

As described above, a power converter according to an embodiment of the present disclosure includes a voltage control loop, and one or both of a proportional coefficient and an integral coefficient during a transient mode are gradually decreased until the power converter starts to operate in a normal PFC mode. As a result, an overshoot or an undershoot of an output voltage of the power converter may be substantially prevented when the power converter operates in the transient mode.

In addition, the one or both of the proportional coefficient and the integral coefficient are decreased at a time (e.g., the second time $t_2$ in FIG. 8) when an inductor current (e.g., the inductor current $I_L$ in FIG. 2) of the power converter has a relatively low magnitude. As a result, the voltage controller may not significantly interrupt an operation of a current control loop included in the power converter.

Figure 9:
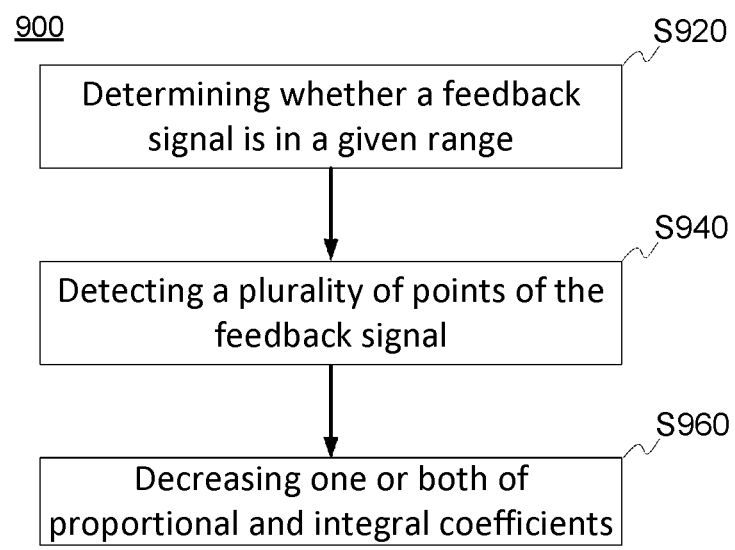
FIG. 9 illustrates a process performed by a voltage control loop of a power converter (e.g., the power converter of FIG. 2) according to an embodiment.

FIG. 9 illustrates a process 900 performed by a voltage control loop of a power converter (e.g., the power converter 200 in FIG. 2) according to an embodiment. The voltage control loop includes a voltage controller (e.g., the voltage controller 210 in FIG. 2) and resistors (e.g., the first and second resistors 242 and 244 in FIG. 2). The voltage controller includes a transient detector (e.g., the transient detector 312 in FIG. 3), an activation circuit (e.g., the activation circuit 322 in FIG. 3), a gain selector (e.g., the gain selector 332 in FIG. 3), and an amplifier circuit (e.g., the amplifier circuit 314 in FIG. 3).

At S920, the transient detector receives a feedback signal (e.g., the feedback voltage $V_{FB}$ in FIG. 2) indicating an output signal (e.g., the output voltage $V_{OUT}$ in FIG. 2) of the power converter and determines whether a value of the feedback signal is in a given range. In an embodiment, the given range is a predetermined range between a value of a first threshold signal (e.g., the first upper threshold voltage $V_{BAND1}$ in FIG. 4) and a value of a second threshold signal (e.g., the first lower threshold voltage $V_{BAND2}$ in FIG. 4).

At S940, the transient detector detects a plurality of points of the feedback signal. For example, the transient detector includes a coupling capacitor (e.g., the coupling capacitor 426 in FIG. 4), a resistor (e.g., the resistor 428 in FIG. 4), and a ZCD comparator (e.g., the ZCD comparator 424 in FIG. 4), which generates a ZCD signal indicating a first plurality of times. The first plurality of times respectively correspond to the plurality of points of the feedback signal, and are respectively associated with a second plurality of times at which a slope of the feedback signal becomes substantially equal to zero. In an embodiment, the first plurality of times are respectively associated with the second plurality of times, such that a delay amount between one of the first plurality of times and a corresponding one of the second plurality of times is determined based on a resistance value of the resistor and a capacitance value of the capacitor.

At S960, the voltage controller decreases one or both of a proportional coefficient and an integral coefficient of a first control loop of the power converter at the first plurality of times when the value of the feedback signal is in the given range. In an embodiment, the voltage controller includes a gain selector, which generates a gain selection signal to change a gain value of the amplifier circuit, leading to a decrease in one or both of a proportional coefficient and an integral coefficient of the voltage control loop. In another embodiment, the voltage controller includes a digital PI controller.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A circuit for controlling a power converter, the circuit comprising:
    a transient detector configured to generate a transient detection signal in response to a feedback signal indicating an output signal of the power converter, the transient detection signal indicating that a value of the feedback signal is in a first range and a slope of the feedback signal is substantially equal to zero;
    a gain selector configured to generate a gain selection signal in response to the transient detection signal; and
    an amplifier circuit configured to generate a comparison signal based on the value of the feedback signal, a value of a reference signal, and a gain value of the amplifier circuit, the gain value being adjusted in response to the gain selection signal at a plurality of times when the power converter operates in a transient mode.

2. The circuit of claim 1, wherein the amplifier circuit is a variable-gain non-linear amplifier including a plurality of transconductance amplifiers.

3. The circuit of claim 2, wherein the gain value of the amplifier circuit has a first value when the value of the feedback signal is in the first range and a second value when the value of the feedback signal is in a second range, the first value being less than the second value.

4. The circuit of claim 2, wherein the first range of the feedback signal is from a lower threshold voltage to an upper threshold voltage, and
    wherein the plurality of transconductance amplifiers includes a first transconductance amplifier having a negative input coupled to a first reference voltage and a positive input coupled to the feedback signal, the first transconductance amplifier beginning to sink a current when the feedback voltage is equal to the lower threshold voltage.

5. The circuit of claim 4, wherein the plurality of transconductance amplifiers further includes a second transconductance amplifier having a negative input coupled to a second reference voltage and a positive input coupled to the feedback voltage, the second transconductance amplifier sinking a maximum current when the feedback voltage is equal to the lower threshold voltage.

6. The circuit of claim 5, wherein the plurality of transconductance amplifiers further includes a third transconductance amplifier having a negative input coupled to a third reference voltage and a positive input coupled to the feedback voltage, the third transconductance amplifier beginning to sink a current when the feedback voltage is equal to the upper threshold voltage.

7. The circuit of claim 1, wherein the transient detector asserts the transient detection signal a given delay after the slope of the feedback signal becomes substantially equal to zero.

8. The circuit of claim 1, wherein the plurality of times is a first plurality of times, and the gain value of the amplifier circuit decreases at the first plurality of times respectively corresponding to a plurality of points of the feedback signal when the value of the feedback signal decreases in the first range.

9. The circuit of claim 8, wherein the first plurality of times are respectively associated with a second plurality of times, the feedback signal having a plurality of peaks at the second plurality of times.

10. The circuit of claim 1, further comprising:
    a capacitor having a first end coupled to an output of the amplifier circuit and a second end coupled to ground; and
    a resistor having a first end coupled to the output of the amplifier circuit and a second end coupled to the first end of the capacitor.

11. The circuit of claim 1, wherein the gain selector adjusts a value of the gain selection signal at the plurality of times, the plurality of times being in a range from 2 times to 9 times.

12. The circuit of claim 1, wherein each of the plurality of times at which the gain value is adjusted lies within a time interval when the value of the feedback signal decreases in the first range.

13. A method for controlling a power converter, the method comprising:
    generating a transient detection signal in response to a feedback signal indicating an output signal of the power converter, the transient detection signal indicating that a value of the feedback signal is in a first range and a slope of the feedback signal is substantially equal to zero;
    generating a gain selection signal in response to the transient detection signal; and
    generating a comparison signal based on the value of the feedback signal, a value of a reference signal, and a gain value of an amplifier circuit, the gain value being adjusted in response to the gain selection signal at a plurality of times when the power converter operates in a transient mode.

14. The method of claim 13, wherein the amplifier circuit includes a first transconductance amplifier and the first range of the feedback signal is from a lower threshold voltage to an upper threshold voltage, and
    wherein generating the comparison signal includes beginning to sink a current by the first transconductance amplifier when the feedback voltage is equal to the lower threshold voltage.

15. The method of claim 14, wherein the amplifier circuit further includes a second transconductance amplifier, and
    wherein generating the comparison signal further includes sinking a maximum current by the second transconductance amplifier when the feedback voltage is equal to the lower threshold voltage.

16. The method of claim 15, wherein the amplifier circuit further includes a third transconductance amplifier, and
    wherein generating the comparison signal further includes beginning to sink a current by the third transconductance amplifier when the feedback voltage is equal to the upper threshold voltage.

17. The method of claim 13, wherein the plurality of times is a first plurality of times, the method further comprising decreasing the gain value of the amplifier circuit at the first plurality of times respectively corresponding to a plurality of points of the feedback signal when the value of the feedback signal decreases in the first range.

18. The method of claim 17, wherein the first plurality of times are respectively associated with a second plurality of times, the feedback signal having a plurality of peaks at the second plurality of times.

19. A power converter comprising:
a current control loop performing a power factor correction (PFC) operation; and
a voltage control loop regulating a level of an output voltage, the voltage control loop including a voltage controller configured to generate a comparison signal indicating a difference between a reference voltage and a feedback voltage, the feedback voltage indicating the output voltage, wherein the voltage controller comprises:
a transient detector configured to generate a transient detection signal in response to the feedback voltage, the transient detection signal indicating that a value of the feedback voltage is in a first range and a slope of the feedback voltage is substantially equal to zero;
a gain selector configured to generate a gain selection signal in response to the transient detection signal; and
an amplifier circuit generating a comparison signal based the value of the feedback voltage, the reference voltage, and a gain value of the amplifier circuit, the gain value being adjusted in response to the gain selection signal at a plurality of times when the power converter operates in a transient mode.

20. The power converter of claim 19, wherein the transient detector asserts the transient detection signal a given delay after the slope of the feedback signal becomes substantially equal to zero.

\* \* \* \* \*